Figure 1:
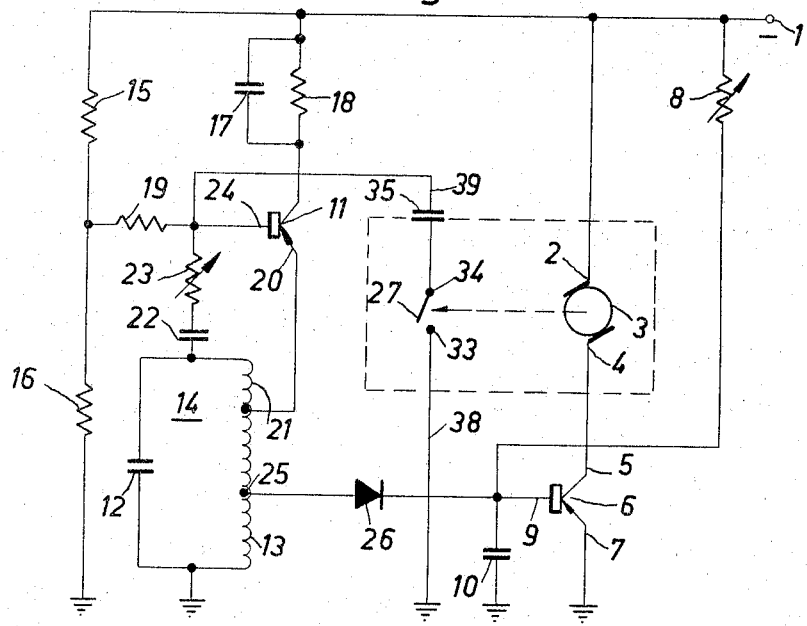

May 2, 1967   J. DORFNER ET AL   3,317,807
SPEED STABILIZATION FOR D.C. MOTORS, MORE
PARTICULARLY FOR TAPE RECORDERS
Filed Nov. 26, 1963

Inventors:

United States Patent Office 3,317,807
Patented May 2, 1967

---

3,317,807
SPEED STABILIZATION FOR D.C. MOTORS, MORE PARTICULARLY FOR TAPE RECORDERS
Josef Dorfner and Heinz Gruber, Kronach, Upper Franconia, Germany, assignors to Loewe Opta Aktiengesellschaft, Berlin, Germany, a company of Germany
Filed Nov. 26, 1963, Ser. No. 326,291
Claims priority, application Germany, Nov. 27, 1962, L 43,560
3 Claims. (Cl. 318—325)

This invention relates to speed stabilization for D.C. motors, more particularly for small D.C. motors in tape recorders or phonographs.

Direct current motors used in portable tape recorders or phonographs must maintain a definite speed during running. According to the quality of the instrument and/or the requisite constant speed this is provided for by more or less complicated mechanical and/or electric governors or regulators.

It is for example known that for portable tape recorders a motor with a centrifugal governor can be used, the contact of which governor closes when speed is reduced and influences a transistor control amplifier so that its collector-emitter section is conductive and bridges a resistance lying in series with the field coils of the motor. This gives the motor a higher voltage, increasing the speed until at a pre-arranged rated speed the governor opens, whereupon the collector-to-emitter conductance of the transistor becomes very small and the resistance comes into full effect.

The material disadvantage of such a speed-regulating switch-over system lies in the fact that the electric connection between the contact of the centrifugal governor fixed on the rotor of the motor and the control amplifier, has to be established over slip rings, which require attendance, and on which undesirable friction arises. As regular cleaning and checking of the slip rings cannot be assumed in practice, an effort is made to solve the problem dispensing with slip rings for the centrifugal governor contact.

In accordance with the present invention slip rings can be dispensed with in an arrangement for speed stabilization for D.C. motors, more particularly for small D.C. motors in tape recorders or phonographs, comprising a centrifugal governor switch mounted on the rotor shaft of said motor, and amplifier for controlling the current supplied to said motor, an oscillator circuit, the output voltage of which forming after rectification a voltage to control said amplifier, and damping means for acting on said oscillator to stop oscillation thereof and being only effective in the switch-on position of said centrifugal governor switch, said damping means being a condenser; said condenser being connected in series to said centrifugal governor switch, both said condenser and said centrifugal governor switch being further connected in parallel to said oscillator circuit.

The accompanying drawing shows an exemplary design of the arrangement in accordance with the invention for speed stabilization of D.C. motors.

Figure 2:
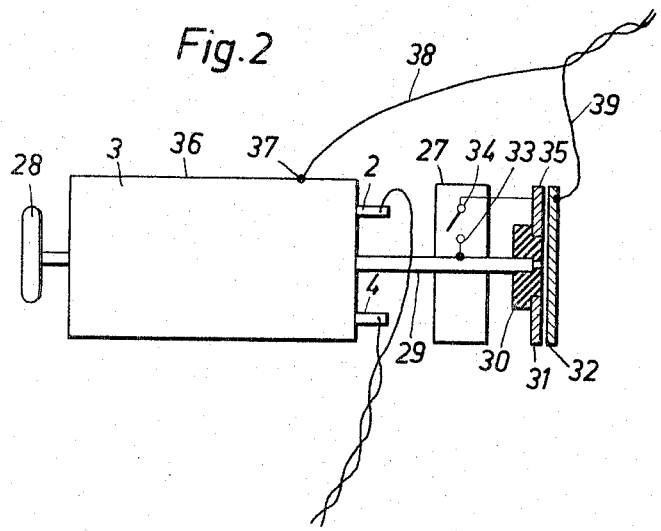

FIG. 1 indicates a circuit plan for the arrangement and FIG. 2 a view of the motor with a condenser plate affixed to the motor shaft and a fixed condenser plate.

In FIG. 1, 1 indicates the negative pole of a feed current source to which a terminal 2 of a D.C. motor 3 is connected. The other terminal 4 of the motor is connected to a collector 5 of a transistor control amplifier 6, with an earthed emitter connection 7. The bias required for setting the working point on the characteristic curve of transistor 6 is taken from the feed current source and applied over an adjustable resistance 8 to the base electrode 9. The base electrode is connected to earth via a condenser 10. There is also provided a transistor oscillator with a transistor 11 and an oscilltor circuit 14 consisting of a condenser 12 and an induction coil 13. The steady operating point of transistor 11 is substantially defined by the size of the voltage divider resistances 15, 16, a collector resistance 18 A.C. bridged by a condenser 17, and a resistance 19. The feedback branch of the oscillator leads from the emitter electrode 20 over a portion 21 of the induction coil 13, a condenser 22 and an adjustable resistance 23 to base electrode 24 of the transistor 11.

When the circuit is connected to the direct-current supply and the previously fixed rated speed of the motor has been reached, the oscillator begins to operate so that alternating voltage occurs between a coil tapping 25 and earth, which voltage after being rectified by a diode 26 influence the base emitter circuit of transistor 6. The bias for transistor 6 and the tapping 25 on coil 13 are selected so that when the oscillator is operating the collector-emitter section of transistor 6 shows a relatively high resistance. If the speed drops below the rated speed, the oscillator is switched off by a centrifugal switch 27 in the manner more closely described below, so that the control voltage supplied by diode 26 collapses, the collector-emitter section of transistor 6 reduces resistance and motor voltage and speed rise. This alternation is repeated in accordance with the fluctuations of speed, the pre-arranged rated speed being kept at the mean.

The oscillator is cut out, as mentioned above, by means of a centrifugal switch 27, fixed to the shaft of motor 3. In order to dispense with slip rings for the electric connection between the centrifugal switch to control amplifier, a capacity coupling is provided for, an example of whose practical operation is given in FIG. 2. On the side of motor 3, away from a driving pinion 28 the motor shaft 29 is lengthened. It bears the centrifugal switch 27 and a condenser plate 31 electrically separated from the shaft by a piece of insulating material 30, to which condenser plate 31 there is disposed parallel and at a slight distance a fixed condenser plate 32, which for example could also be formed by a portion of the metal motor housing. A terminal 33 of the centrifugal switch is connected with the metal motor shaft 29 and the other terminal 34 with the condenser plate 31. The plates 31 and 32 are entirely of metal or coated with metal, form a condenser 35 (FIG. 1) which is connected in series with contact 27.

The motor shaft 29 has a conductive connection to the metal motor housing 36, at whose point 37 an earth lead 38 is connected. A lead 39 connected with the fixed condenser plate 32 is as shown in FIG. 1 connected to the base electrode 24 of transistor 11. When contact 27 is closed (motor speed below pre-arranged rated speed) the condenser 35 formed by the condenser plates and earth consequently shunts to the backfeed branch of the transistor oscillator, resulting in the backfeed factor being smaller than 1 and the oscillations of the oscillator being interrupted. When the centrifugal switch is open (motor speed equal to pre-arranged rated speed), on the other hand, the condenser 35 does not come into action, so that the oscillator can oscillate.

What we claim is:
1. An arrangement for speed stabilization for D.C. motors, more particularly for small D.C. motors in tape recorders or phonographs, comprising a centrifugal governor switch mounted on the rotor shaft of said motor, an amplifier for controlling the current supplied to said motor, an oscillator circuit, the output voltage of which forming after rectification a voltage to control said amplifier, and damping means for acting on said oscillator to stop oscillation thereof and being only effective in the switch-on position of said centrifugal governor switch, said damping means being a condenser; said condenser being connected in series to said centrifugal governor switch, both said condenser and said centrifugal governor switch being further connected in parallel to said oscillator circuit; said condenser consisting of a first metal disc mounted on and insulated from the motor shaft and a second stationary metal disc mounted parallel to and in a certain distance from said first disc.

2. An arrangement for speed stabilization for D.C. motors, more particularly for small D.C. motors in tape recorders or phonographs, comprising a centrifugal governor switch mounted on the rotor shaft of said motor, an amplifier for controlling the current supplied to said motor, an oscillator circuit, the output voltage of which forming after rectification a voltage to control said amplifier, and damping means for acting on said oscillator to stop oscillation thereof and being only effective in the switch-on position of said centrifugal governor switch, said damping means being a condenser; said condenser being connected in series to said centrifugal governor switch, both said condenser and said centrifugal governor switch being further connected in parallel to said oscillator circuit; said condenser consisting of a first metal disc mounted on and insulated from the motor shaft and a second stationary metal disc mounted parallel to and in a certain distance from said first disc, said stationary metal disc of said condenser being connected with the high side of said oscillator circuit, and said motor shaft mounted metal disc being connected over said centrifugal governor switch to earth.

3. An arrangement as claimed in claim 2, wherein said stationary metal disc of said condenser is formed by a portion of the motor housing.

References Cited by the Examiner

UNITED STATES PATENTS

| | | | |
|---|---|---|---|
| 2,596,751 | 5/1952 | Wild | 318—325 |
| 2,673,320 | 3/1954 | Oliwa | 318—325 |
| 2,935,674 | 5/1960 | Hohne | 318—325 X |
| 3,038,110 | 6/1962 | Paist | 318—325 |
| 3,143,695 | 8/1964 | Hohne et al. | 318—325 X |
| 3,184,671 | 5/1965 | Riggs | 318—325 |
| 3,221,235 | 11/1965 | Scholl | 318—325 |
| 3,239,739 | 3/1966 | Scholl | 318—325 X |

ORIS L. RADER, *Primary Examiner.*

G. SIMMONS, *Assistant Examiner.*